Patented Jan. 30, 1934

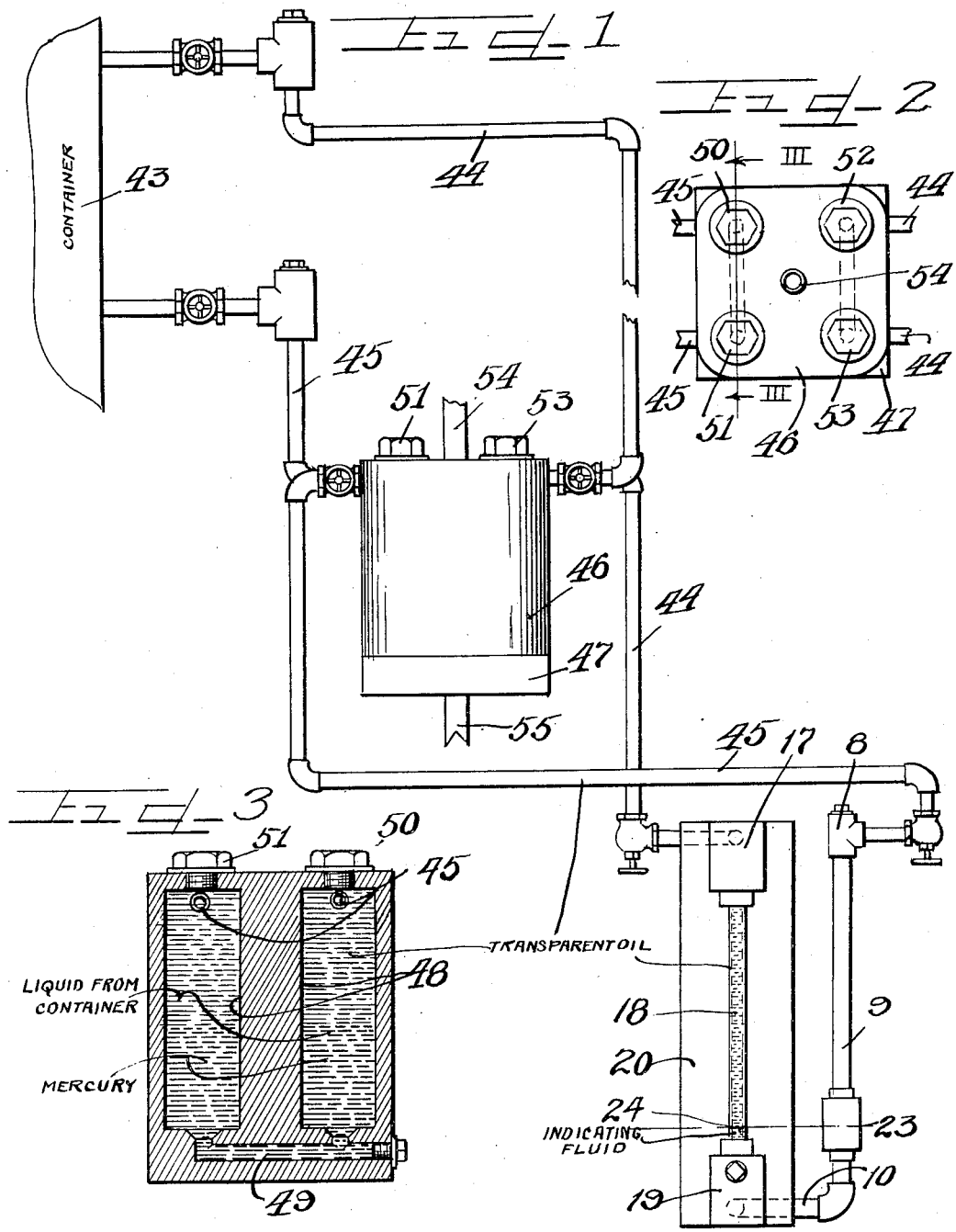

1,944,943

UNITED STATES PATENT OFFICE 1,944,943

LIQUID LEVEL INDICATOR

Frederic McNeill, Chicago, Ill., assignor, by mesne assignments, to T. W. McNeill, Chicago, Ill., doing business as Boiler Room Improvement Co.

Application October 13, 1928. Serial No. 312,227

1 Claim. (Cl. 73—54)

This invention relates to improvements in liquid level indicators of the type commonly used for indicating the level of liquids in various containers and located at a remote point from the container, although the gauges herein described may have many and varied uses as is apparent to one skilled in the art. The present invention is also an improvement over the structure shown in my "Liquid level indicator", Patent No. 1,699,075 and Patent No. 1,733,616.

The present invention contemplates the provision of a liquid level indicator for indicating the level of a liquid in a container more reliably and accurately than gauges heretofore known, the indicator being disposed above, below or in proximity to the actual level of the liquid in the container and at a remote or adjacent point thereto.

The invention also seeks the provision of a liquid level indicator designed to eliminate errors due to temperature variations in the various connecting pipes or conduits between different elements of the gauge or indicator.

Another object of the present invention is to provide a device of the character described herein which may or may not utilize a plurality of liquids in the conduits in addition to the indicating liquid, and which, when a plurality of liquids are used, is provided with means for effectively separating these liquids from the liquids the level of which is to be indicated.

Another object of the present invention is to provide a device of the character described herein including a plurality of liquids in the conduits thereof, which liquids, when the liquid to be indicated is under any degree of vacuum, are not subjected to that vacuum.

A further object of the present invention is to provide a gauge for indicating the level of various liquids which freeze at a relatively high temperature, the gauge being equipped with means to maintain its temperature above the freezing point of whatever liquid is being indicated.

While some of the more salient features, characteristics and advantages of devices embodying principles of the present invention have been above pointed out, others will become apparent from the following disclosures.

The invention includes these and other features of construction and combinations of parts hereinafter described, and shown in a preferred form in the drawing, as more particularly indicated by the claim.

On the drawing:

Figure 1 is a fragmentary view in elevation of a liquid level indicator embodying principles of the present invention.

Figure 2 is a fragmentary top plan view of the central portion of the structure shown in Figure 1.

Figure 3 is a fragmentary vertical sectional view taken substantially as indicated by the line III—III of Figure 2.

As shown on the drawing:

In the accompanying drawing there is disclosed in Figure 1 a liquid level indicator embodying the principles of my invention. This indicator in general broadly comprises a remotely located indicating element, and a mercury element adjacent the liquid the height of which is to be indicated. This mercury element is provided with heating means, whereby the device of my invention is adapted for indicating the level of various liquids at relatively high temperatures and is especially desirable for indicating the level of a liquid such as diphenyl which freezes at substantially 180° F.

The remotely located indicating element comprises a T connection 8 at the upper end of a vertically disposed conduit 9 which is connected at its lower end to a trap 19 by pipe 10. Also connected to the trap 10 is a transparent tube 18 of glass or other suitable material, which is disposed in parallel relationship to the conduit 9. The upper end of the tube 18 terminates in a reservoir 17 which is adapted to have a pipe connection made thereto. Mounted adjacent the tube 18 is a backboard 20 upon which any suitable scale may be provided.

The indicating element is connected to a container 43 having a liquid therein the height of which it is desired to indicate, this connection being accomplished by conduits 44 and 45 which are connected at the indicator to the reservoir 17 and T 8 respectively. These conduits are preferably of substantially the same length in order that they will be equally influenced by changes of temperature, thereby enabling the indicating element to more accurately indicate the height of liquid in the container 43.

The mercury containing element is preferably positioned in rather close proximity to the container 43, and this element is incorporated in a housing 46 mounted upon a base 47. This housing is divided in its interior into four chambers 48, as shown in Figure 3, which are interconnected in pairs by conduits or passages 49 adjacent the bottoms of the chambers. These chambers are closed at the upper ends thereof by suitable plugs 50, 51, 52 and 53 respectively, the chambers corresponding to the plugs 52 and 53 being interconnected so as to form in effect a part of the conduit 44, and the chambers corresponding to plugs 50 and 51 likewise forming a part of the conduit 45. These chambers, it will be observed, form a U-shaped trap in each of the conduits 44 and 45.

The portion of my invention just described is adapted for measuring or indicating the height of fluid in a tank, where the fluid is in liquid form at normal temperatures. With the arrangement just described, the indicating element may be mounted in any desired position, and may be placed above the container on a level with the container or below the container without affecting the operation of the indicator. Further, since the conduits 44 and 45 are of substantially the same length, they will be equally affected by changes of temperature.

In connection with the device just described, I prefer to use non-miscible liquids such as mercury, light transparent oil, and a dark indicating liquid. The traps formed by the chambers as hereinbefore described are filled substantially half-full of mercury, there being liquid from the container above the mercury on one leg of the trap, and the aforementioned light transparent oil fills the other leg of the traps above the mercury. The lower portion of the U-shaped tube in the indicating element formed by the conduit 9, trap 19, pipe 10 and transparent tube 18 contains a quantity of indicating liquid, the portions of the U-shaped tube above the indicating liquid being filled with the transparent oil which also extends throughout the conduits 44 and 45 and into the traps of the mercury containing element as before described.

With the foregoing arrangement, changes of the height of liquid in the container 43 will cause proportional changes in the height of the indicating liquid in the transparent tube 18, in a manner well understood in the art. By the provision of a suitable scale adjacent the tube 18, the height of liquid in the container 43 may be ascertained by observing the height of indicating fluid in the tube 18 relative to this scale.

Although the foregoing arrangement is admirably adapted for indicating the height of fluids which are in a liquid state at usual temperatures, such an arrangement is not adapted for indicating liquids which freeze at very high temperatures, such as diphenyl which freezes at substantially 180° F. In order to adapt my invention for the indication of such liquids, means are provided for heating the mercury trap and adjacent connections to a sufficiently high temperature to prevent the liquid from the container freezing. For this purpose, the housing 46 is preferably heat insulated and provided adjacent the center thereof with a passage therethrough which is connected to steam pipes 54 and 55 at opposite ends thereof.

It is to be understood that although my invention has been described as utilizing a plurality of non-miscible liquids, namely, mercury, light oil and indicating liquid, that any desirable liquids having no affinity for each other and bearing the desired ratios of specific gravity may be substituted for the liquids herein mentioned. It should also be understood that whenever circumstances warrant, the transparent oil may be dispensed with and air utilized in the conduits between the mercury and the indicating liquid. With air only in the conduits the indicator will function the same as with the transparent oil, with the exception that instead of forcing the transparent oil through the conduits, the air therein would be compressed by the movement of the mercury and indicating fluid and the same results would be attained. As in the case of the transparent oil, the air in each conduit would be equally affected by temperature changes so that such changes would in no manner affect the reading of the indicating liquid in the tube 18.

From the foregoing, it will be apparent that my invention provides means for accurately and precisely indicating at a remote point liquid levels in a container, the means being unaffected by variations in temperature, and being disposable above, below, or on a level with the liquid in the container. Further, the means of my invention are readily adapted for indicating liquids which are not in liquid state at high temperatures, such as diphenyl. It will also be appreciated that the indicating means described herein are simple in construction, easily installed, efficient in their operation, durable, and may be economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

In combination, a liquid level indicator comprising a casing having a plurality of chambers therein, said chambers being interconnected so as to form a pair of traps, indicating means remotely disposed from said traps, a conduit for each of said traps connected to said indicating means, and means for passing steam through said casing for maintaining the same above a predetermined temperature.

FREDERIC McNEILL.